US009015240B2

(12) United States Patent
Riggs

(10) Patent No.: US 9,015,240 B2
(45) Date of Patent: Apr. 21, 2015

(54) WEB-STYLED MESSAGING SYSTEM

(75) Inventor: Brian J. Riggs, Foster City, CA (US)

(73) Assignee: Arthur Technologies, LLC, Seattle, WA (US)

(*) Notice: Subject to any disclaimer, the term of this patent is extended or adjusted under 35 U.S.C. 154(b) by 2752 days.

(21) Appl. No.: 10/864,032

(22) Filed: Jun. 9, 2004

(65) Prior Publication Data

US 2005/0278434 A1    Dec. 15, 2005

(51) Int. Cl.
*G06F 15/16* (2006.01)
*G06Q 10/10* (2012.01)

(52) U.S. Cl.
CPC ..................... *G06Q 10/107* (2013.01)

(58) Field of Classification Search
CPC ..... G06Q 10/10; G06Q 10/107; G06Q 30/02; G06Q 30/0601; H04L 51/22; H04L 12/1831; H04L 12/581; H04L 67/02
USPC .......... 709/204–206, 217; 715/201, 202, 205, 715/700, 727, 733, 751, 753
See application file for complete search history.

(56) References Cited

U.S. PATENT DOCUMENTS

| | | | | |
|---|---|---|---|---|
| 6,484,196 B1* | 11/2002 | Maurille | | 709/206 |
| 6,898,626 B2* | 5/2005 | Ohashi | | 709/206 |
| 6,968,362 B2* | 11/2005 | Koch et al. | | 709/206 |
| 7,203,704 B1* | 4/2007 | Stern et al. | | 707/627 |
| 7,634,546 B1* | 12/2009 | Strickholm et al. | | 709/207 |
| 2001/0018704 A1* | 8/2001 | Kikugawa | | 709/206 |
| 2002/0059399 A1* | 5/2002 | Learmonth | | 709/219 |
| 2002/0178179 A1* | 11/2002 | Rosenblum et al. | | 707/500 |
| 2003/0097410 A1* | 5/2003 | Atkins et al. | | 709/206 |
| 2003/0191812 A1* | 10/2003 | Agarwalla et al. | | 709/217 |
| 2004/0098754 A1* | 5/2004 | Vella et al. | | 725/135 |
| 2004/0181540 A1* | 9/2004 | Jung et al. | | 707/100 |
| 2004/0205494 A1* | 10/2004 | Bernius et al. | | 715/501.1 |
| 2004/0225716 A1* | 11/2004 | Shamir et al. | | 709/204 |
| 2005/0138121 A1* | 6/2005 | Banatwala et al. | | 709/205 |
| 2006/0041830 A1* | 2/2006 | Bohn | | 715/501.1 |

* cited by examiner

*Primary Examiner* — Alina N Boutah
(74) *Attorney, Agent, or Firm* — Christensen O'Connor Johnson Kindness PLLC

(57) ABSTRACT

Various embodiments of the present invention allow a user to post messages regarding Web resources formed from such elements as Web pages, images, video files, audio files, and executable applications. These messages are maintained independent from the Web resource so that the user is liberated to express his opinions about Web resources.

12 Claims, 11 Drawing Sheets

WEB-STYLED MESSAGING SYSTEM

FIELD OF THE INVENTION

The present invention relates generally to messaging systems, and more particularly, to the use of the World Wide Web, computers, and data communication equipment to convey messages from one person to many persons.

BACKGROUND OF THE INVENTION

Before electronic mail (e-mail), computer users communicated using bulletin board systems, which are computer systems equipped with one or more modems or other means of network access that serves as an information and message-passing center for remote computer users. Often, bulletin board systems are focused on special interests, such as science fiction, movies, Windows software, Macintosh systems, etc., and can have free or fee-based access, or a combination of both. Computer users dial into a bulletin board system with their modems and post messages to other bulletin board system users in special areas devoted to a particular topic, in a manner reminiscent of the posting of notes on a cork bulletin board. With the growing popularity of electronic mail, bulletin board systems have disappeared.

There is an unspoken electronic mail convention in that a reply to a piece of e-mail is expected. To do otherwise would be considered uncouth in the etiquette of exchanging information using electronic mail. This is because electronic mail is a private communication between two parties. But there are situations in which a user may wish to express his opinions to the world without an expectation of a reply. For example, upon reading an on-line article, the user may strongly disagree with the viewpoint of the article and may thereby desire to voice his opinion about the article. Electronic mail seems an inappropriate facility to publicly express one's opinions. These and other problems associated with electronic mail have resurrected the use of bulletin board systems in the form of message boards on the World Wide Web. See system 100 shown in FIG. 1.

The system 100 includes the personal computer 102, which is a computer designed for use by one person at a time. Personal computers do not need to share the processing, disk, and printer resources of another computer. IBM PC-compatible computers and Apple Macintoshes are both examples of personal computers. If the personal computer 102 employs a graphical user interface, a mouse 104 coupled to the personal computer 102 can be used to navigate a pointer in the graphical user interface and applications running on such a graphical user interface.

One application example is application 106, which is a program designed to assist in the performance of a specific computing task, such as word processing, accounting, or inventory management. In the illustrated instance, the application 106 is a Web browser, which is a piece of software that lets a user view HTML documents and access files and software related to those documents. The application 106 includes a toolbar 106D, which is a horizontal space at the top of a window that contains a number of buttons in iconic form 106A-106C to allow a user to access various Web pages, which is formed from a total set of interlinked hypertext documents residing on HTTP servers all around the world. The button 106A, which appears as a left pointing arrow enclosed by a circle, allows the user to move backward through a history of displayed Web pages. The button 106B, which appears as a right-pointing arrowhead enclosed in a circle, allows the user to advance to new Web pages previously undisplayed. The button 106C is a HOME button that appears as a simple house enclosed in a circle, which returns the user to a home page when clicked upon. Appearing in the right corner of the toolbar 106D is the name of the page, which in this instance is "HOME."

A frame 106E defines a rectangular section of the application 106, which is subjacent to the toolbar 106D, and allows Web pages to be displayed. Web pages are written in HTML (Hypertext Markup Language), identified by URLs (uniform resource locators) that specify the particular machine and path name by which a file can be accessed, and transmitted from server to end user under HTTP (hypertext transfer protocol). In the illustrated instance, the frame 106E displays an on-line article, which is a composition forming an independent part of an online publication. The article has a title, "2 INGREDIENTS TO CREATE WEALTH!" A portion of the article appears in the frame 106E: "If you are in your thirties, you have thirty years or more until your retirement. You have the first ingredient to create wealth—time." As is typical, at the end of the article there is a way for the user to rate the article. Line 106F displays a sentence with various numerical designations, allowing the user to classify or assign the relative rank of the article: "RATE THIS ARTICLE 1 2 3". The underlined numerical designations (1, 2, and 3) signify that the user may use the mouse 104 to select one of the numerical designations to classify the article. Alternatively, the user may select a hyperlink "POST A MESSAGE TO A MESSAGE BOARD" at line 106G to voice his opinion about the on-line article.

Upon selection of the hyperlink at line 106G, the user is brought to a message board, which operates much like a bulletin board system. If the user has not logged into the bulletin board system that maintains the message board, the user will be asked to enter a user name, password, and so on, in order to access the message board in which a user may post messages. The main problem is that because each message board is maintained by a different bulletin board system, the user has to enter different pieces of information just to post messages. For example, message boards maintained by different bulletin board systems require different user names and passwords for a user. For the user to track and remember a multitude of different user names and passwords is not only onerous but becomes impossible beyond a certain number of user names and passwords.

Another problem with conventional message boards is that these message boards are maintained by the sponsors of Web pages associated with the message boards. It is in the interest of these sponsors to edit unflattering messages from their message boards. Thus, these message boards are not a public forum in which users may express their speech but instead a private medium in which messages can be removed at the whim of the sponsors, much like posting notes on a cork bulletin board at a supermarket in which the supermarket's management may remove notes that they feel violate their policies. An additional problem with conventional message boards is that they can only accommodate textual information. Users may want to communicate using information that is not textual in form.

Thus, there is a need for a method and a system for providing a forum on the Internet for threaded discussions of Web pages using text and other media types while avoiding or reducing the foregoing and other problems associated with existing message boards.

SUMMARY OF THE INVENTION

In accordance with this invention, a system, method, and computer-readable medium for creating message boards regarding Web resources is provided. The system form of the invention includes a computer system. The computer system comprises a Web browser operable by a user to access Web resources. The Web browser is receptive to a uniform resource locator to locate a Web resource. The computer system also comprises a user interface indicator that demonstrates the presence or the absence of a message board connected with the Web resource. The message board references one or more messages. Each message is associated with the Web resource by storing in the metadata of the message the uniform resource locator of the Web resource.

In accordance with another aspect of the invention, a method form of the invention includes searching a database to form a collection of messages whose metadata includes a uniform resource locator of a Web resource. The collection of messages is defined as a message board. The method further comprises indicating to a user the presence or the absence of the message board. The message board is present if one or more messages are found by the act of searching. The message board is absent if the act of searching cannot find at least one message.

In accordance with another aspect of the invention, a computer-readable medium form of the invention includes instructions stored thereon for searching a database to form a collection of messages whose metadata includes a uniform resource locator of a Web resource. The collection of messages is defined as a message board. The instructions of the computer-readable medium further comprise indicating to a user the presence or the absence of the message board. The message board is present if one or more messages are found by the act of searching. The message board is absent if the act of searching cannot find at least one message.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

There are many Web resources, such as Web pages, images, video files, audio files, and applications, available on the Internet. Various embodiments of the present invention allow a user to post messages regarding Web resources. These messages are maintained independently from the Web resource so that the user is liberated to express his opinions about Web resources. Messages can be textual in form but can be in any other suitable media type, such as graphics, audio, video, or executable applications.

Figure 1:
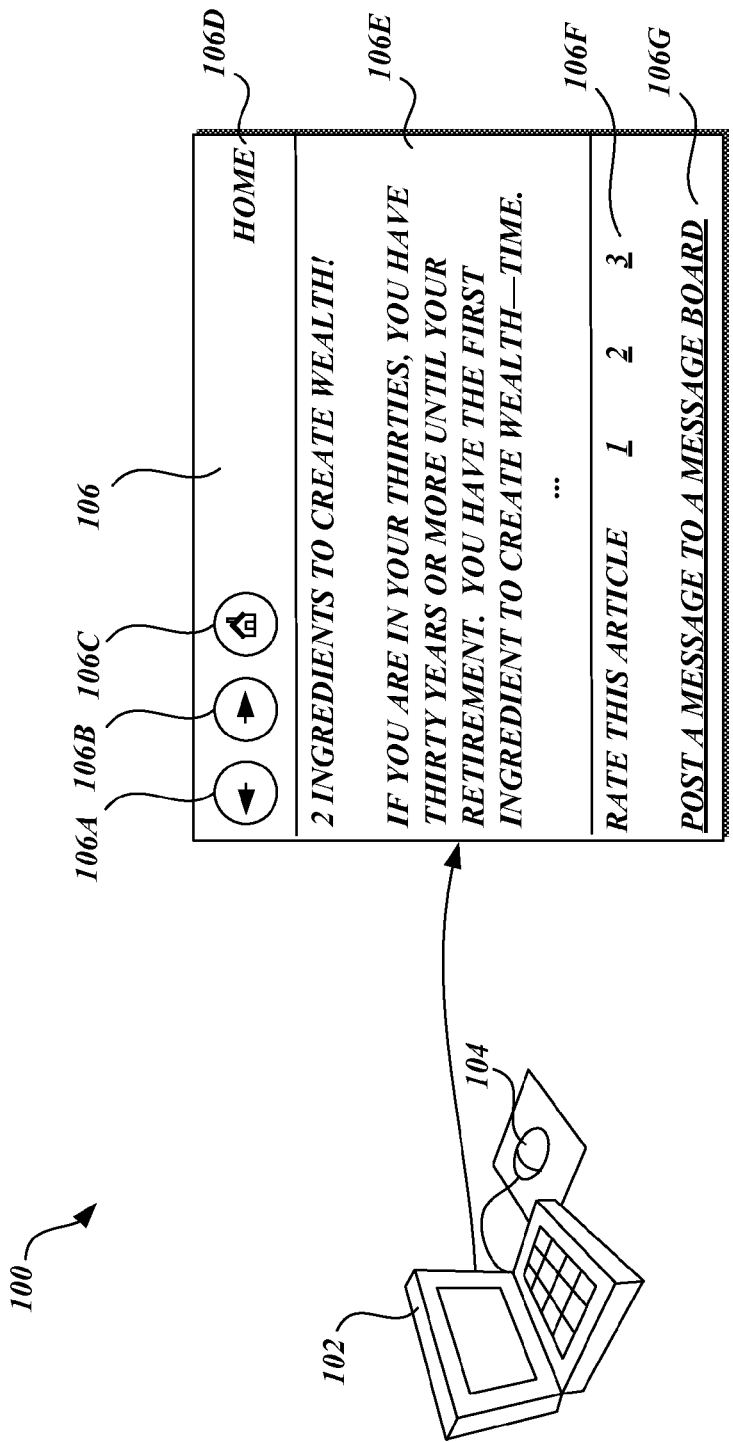
FIG. 1 is a block diagram illustrating a conventional computer and Web browser.
Figure 2:
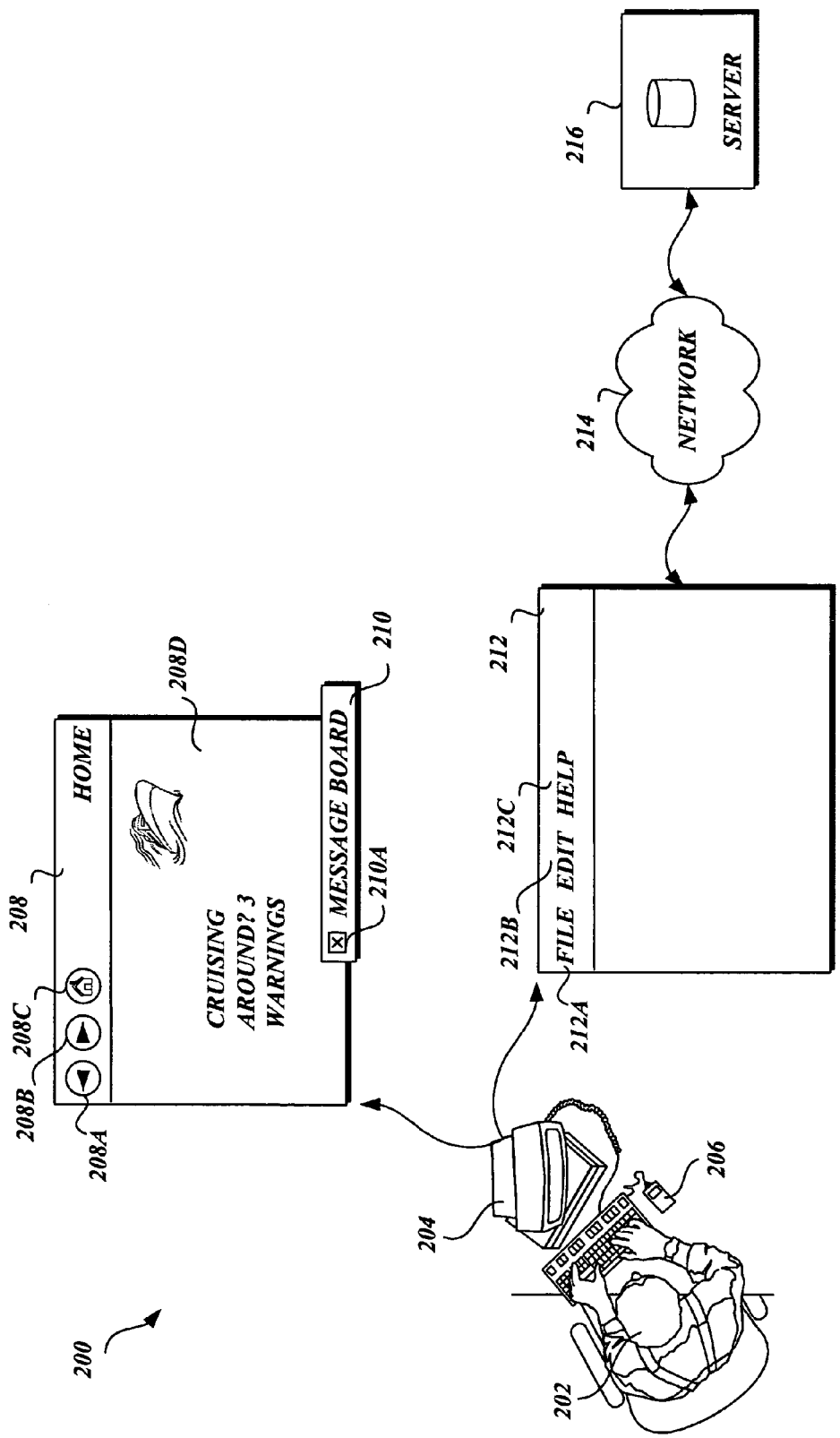
FIG. 2 is a block diagram illustrating a Web browser, a message board indicator, and a message board program, in accordance with one embodiment of the present invention.

A system 200 is shown in FIG. 2 in which a user 202 operates a mouse 206 to navigate a user interface on a personal computer 204. The system 200 is a computing environment that has pieces of hardware, software applications, and an operating system running on it. The personal computer 204 is a machine capable of repetitively and quickly performing calculations and instructions, and is designed to be used by one person at a time. The personal computer 204 is smaller, less expensive, and easier to use than other classes of computers, such as supercomputers, mainframe computers, and workstations. Personal computers, such as the personal computer 204, provide computational abilities at a low cost to people who lack extensive programming experience. The user 202 operates the personal computer 204 to interface with worldwide communication networks, such as the Internet, and a graphics-based information database, known as the World Wide Web, to find information on virtually any subject.

Among applications running on the personal computer 204 is a Web browser application 208, which allows the user 202 to access the World Wide Web. The application 208 includes a toolbar, which is a horizontal space at the top of a window that contains a number of buttons in iconic form 208A-208C. These buttons in iconic form 208A-208C allow the user 202 to access various user interface pages of the application 208. The button 208A, which appears as a left pointing arrowhead enclosed by a circle, allows the user 202 to move backward through a history of displayed pages. The button 208B, which appears as a right-pointing arrowhead enclosed in a circle, allows the user to advance to a new page previously undisplayed. The button 208C is a HOME button that appears as a simple house enclosed in a circle, which returns the user 202 to a HOME page when clicked upon. Appearing at the right corner of the toolbar is the name of the page, which in this instance is "HOME." A frame 208B defines a rectangular section of the Web browser 208, which is subjacent to the toolbar, and allows Web pages to be displayed. As the user 202 navigates to Web pages, they appear in the frame 208D. For example, in the illustrative instance, the user 202 has entered upon an on-line article whose title is "CRUISING AROUND? 3 WARNINGS," accompanied by a picture of a cruise ship.

Using various embodiments of the present invention, the user 202, as well as other users, may post messages regarding a Web page, such as the Web page displayed in the illustrative instance at the frame 208D. Various embodiments of the present invention allow such messages to be posted to a message board whether or not the Web page or the Web site supports the posting of messages. Various embodiments of the present invention provide a user interface element 210 to signify whether there are messages posted by users, such as the user 202, in connection with the Web page displayed in the frame 208D. Any suitable presentation by the user interface element 210 to indicate the absence or the presence of messages can be used. For example, a text indicator "MESSAGE BOARD" can appear within the user interface element 210 to indicate the presence of a message board available for access to view messages contained therein. Another suitable indicator is a message board indicator 210A, which illustrates the existence or the absence of messages in a message board connected with the Web page being shown in the frame 208D.

Among applications running on the personal computer 204 is an application 212, which is a message board program designed to assist the user 202 to create a message board connected with a Web page if there is none previously; alternatively, the application 212 can be used to add messages or reply to other messages in an existing message board. As is typical with most applications, the application 212 includes a menu bar, which contains various menus, such as a FILE menu 212A, an EDIT menu 212B, and a HELP menu 212C.

Each menu, when selected, drops from the menu bar to reveal a list of options from which a user can make a selection in order to perform a desired action, such as choosing a command to create a message. Each menu, when selected, remains open without further action until the user 202 closes the menu or chooses a menu item. Preferably, the application 212 obtains from the Web browser 208 the uniform resource locator ("URL") of a particular Web page when the user 202 navigates to the particular Web page. The URL is an address for a resource, such as a Web page on the Internet. URLs are used by Web browsers, such as the Web browser 208, to locate Web resources. The URL specifies the protocol to be used in accessing the resource, such as HTTP for a World Wide Web page or FTP for an FTP site; the name of the server on which the resource resides (such as //www.medasu.com); and, optionally, the path to a resource (such as a textual document, or other documents containing different types of media).

The application 212 communicates with a server 216 via a network 214. The network 214 is a group of computers and associated devices that are connected by communication facilities. The network 214 can involve permanent connections, such as coaxial or other cables, or temporary connections made through telephone or other communication links. The network 214 can be as small as a LAN (Local Area Network) consisting of a few computers, printers, and other devices, or it can consist of many small and large computers distributed over a vast geographic area (WAN or Wide Area Network). One exemplary implementation of a WAN is the Internet, which is a world-wide collection of networks and gateways that use the TCP/IP suite of protocols to communicate with one another. At the heart of the Internet is a backbone of high-speed data communication lines between major nodes or host computers, including thousands of commercial, government, educational, and other computer systems that route data and messages. One or more Internet nodes can go off-line without endangering the Internet as a whole or causing communications on the Internet to stop, because no single computer or network controls the entire Internet.

Figure 3:
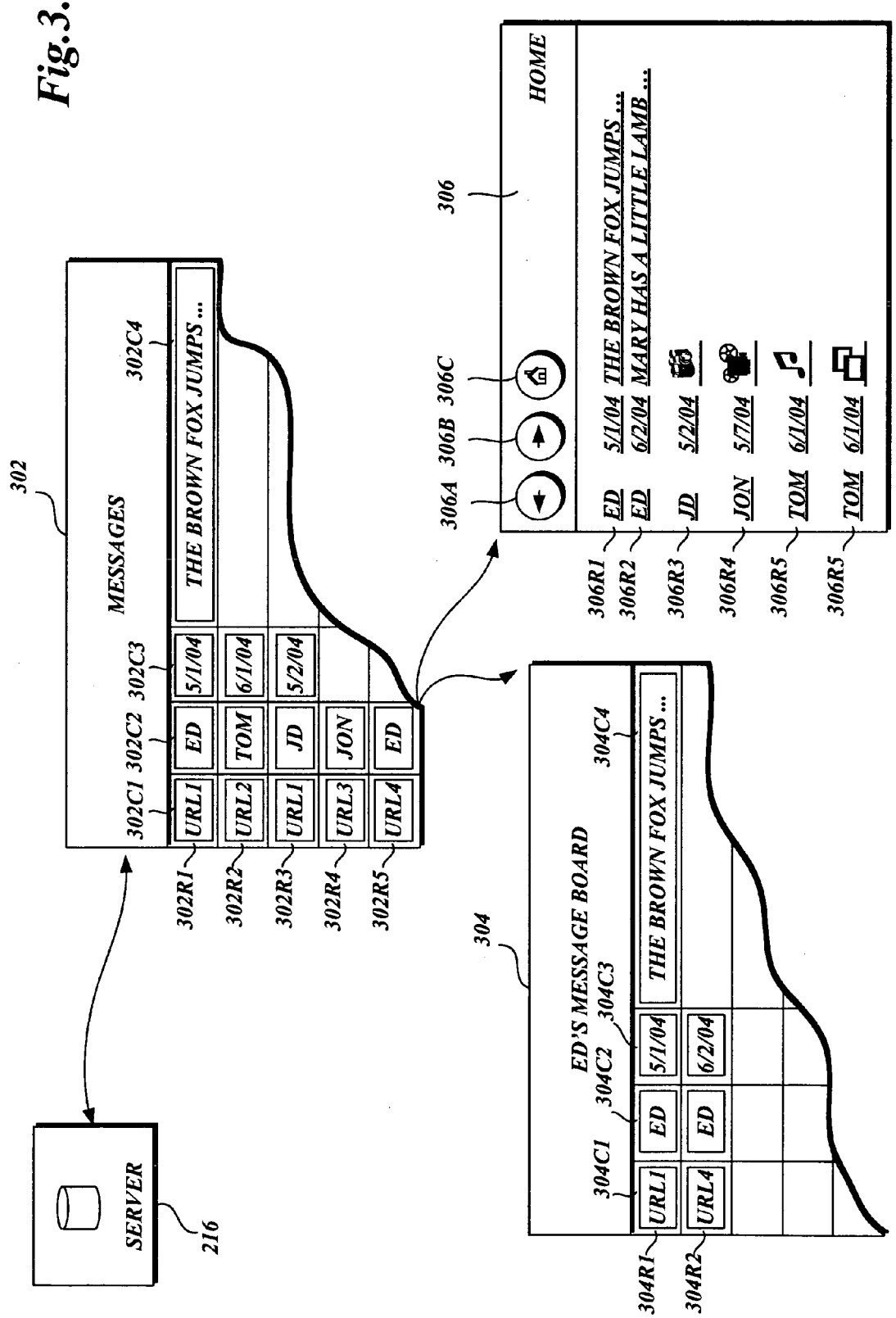
FIG. 3 is a block diagram illustrating data structures for storing messages on a server and the presentation of the messages on a Web page in a Web browser, according to one embodiment of the present invention.
Figure 4A:
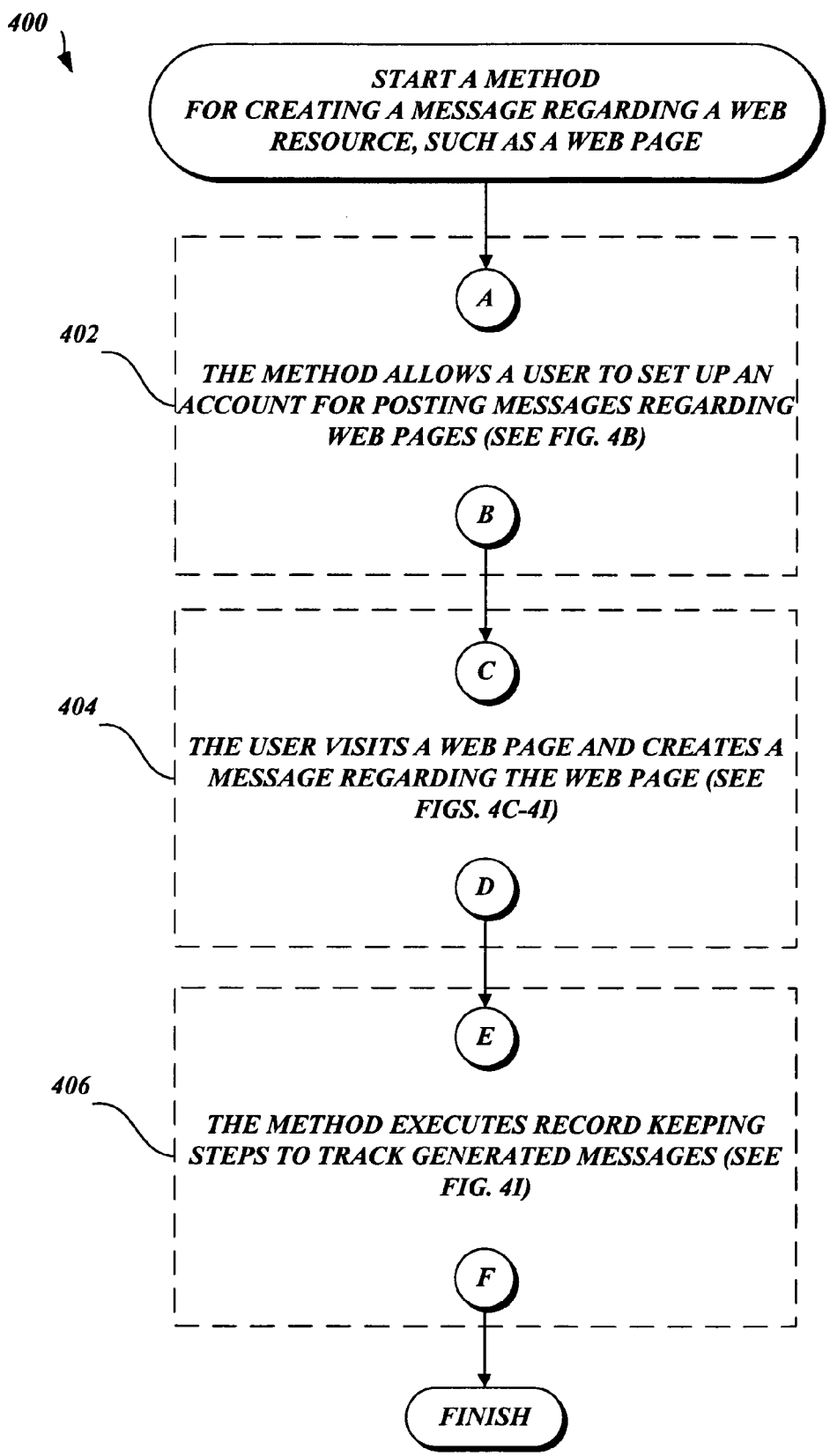
FIGS. 4A-4I are process diagrams illustrating a method for creating a message regarding a Web resource, such as a Web page.
Figure 4B:
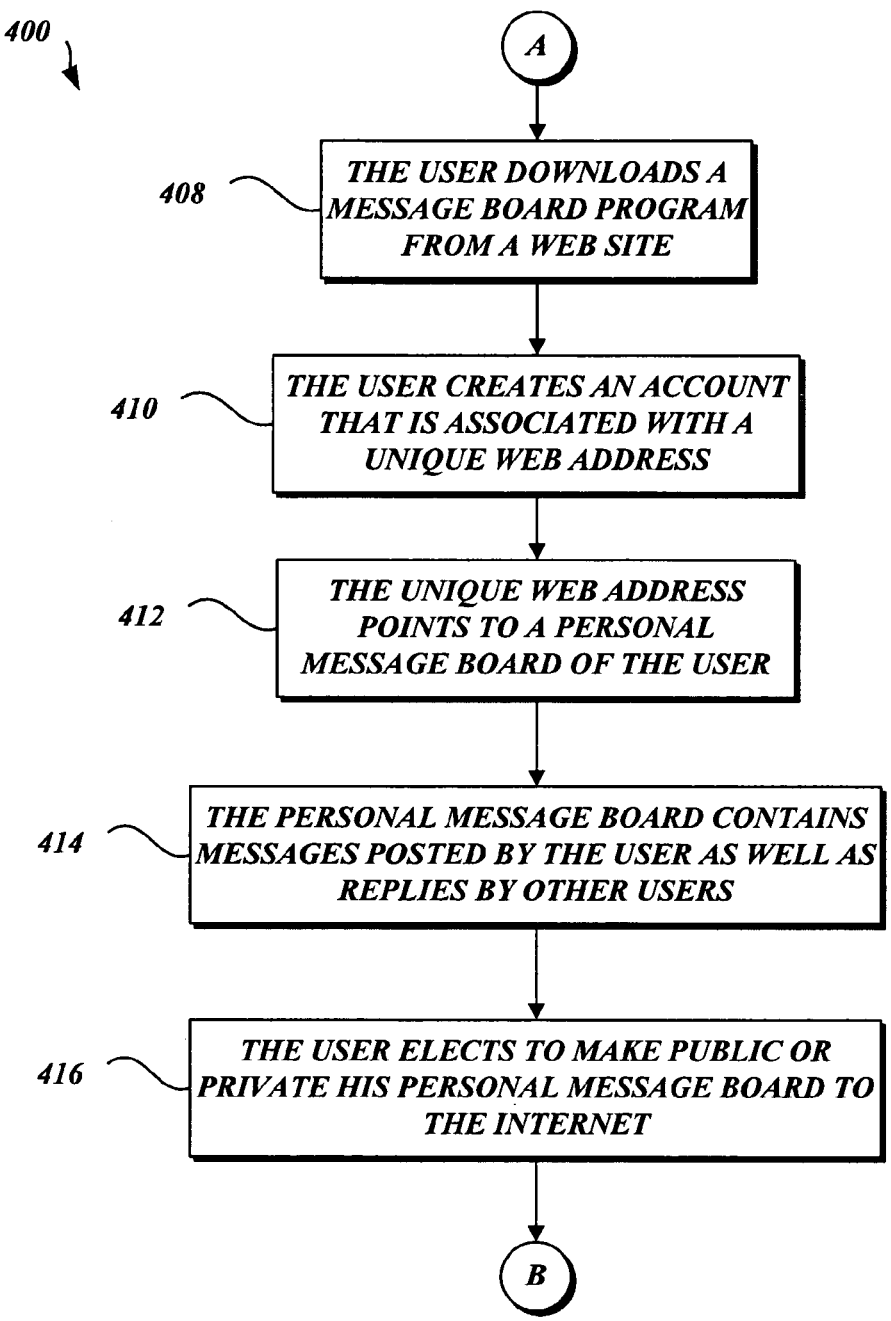
Figure 4C:
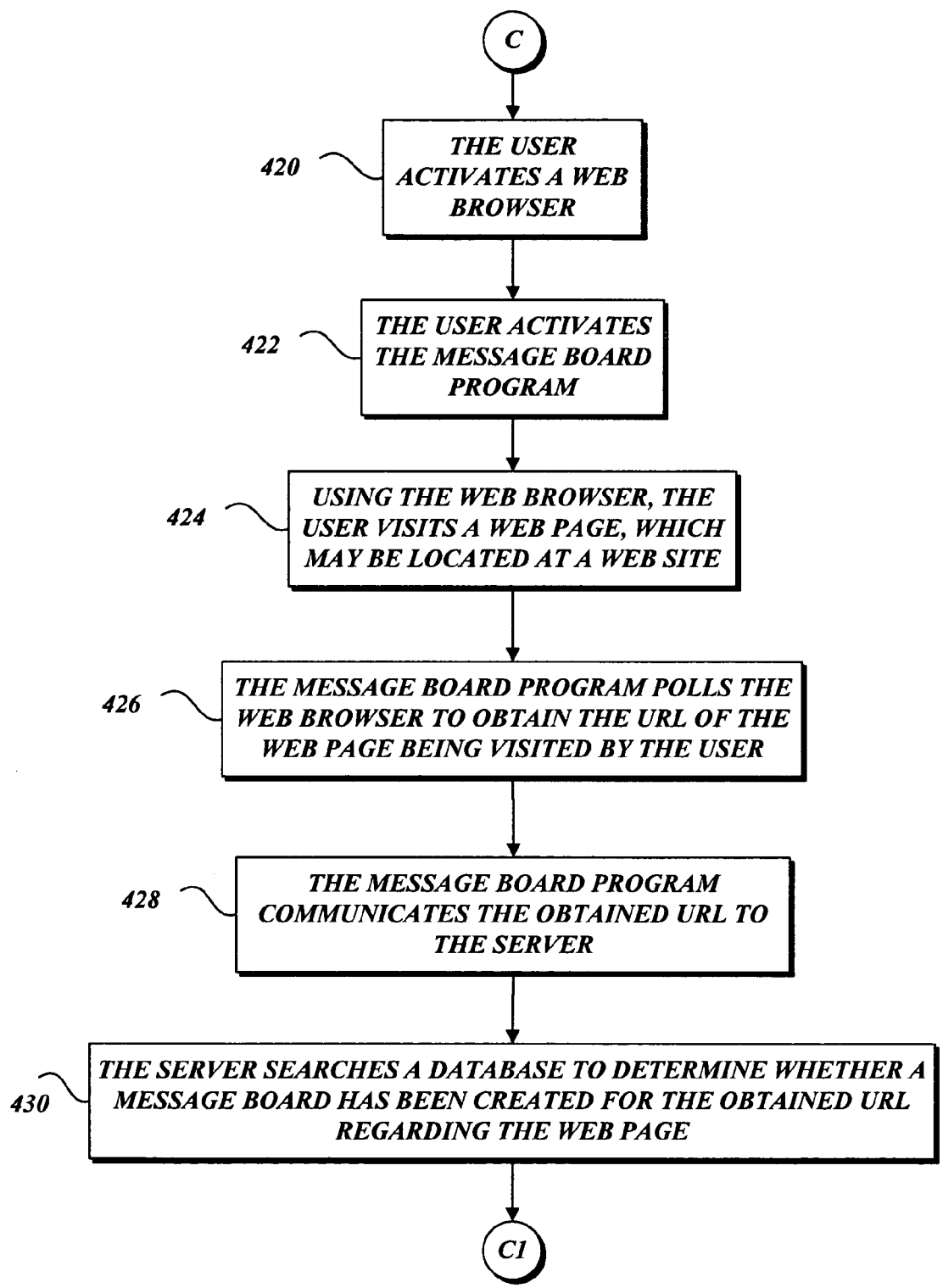
Figure 4D:
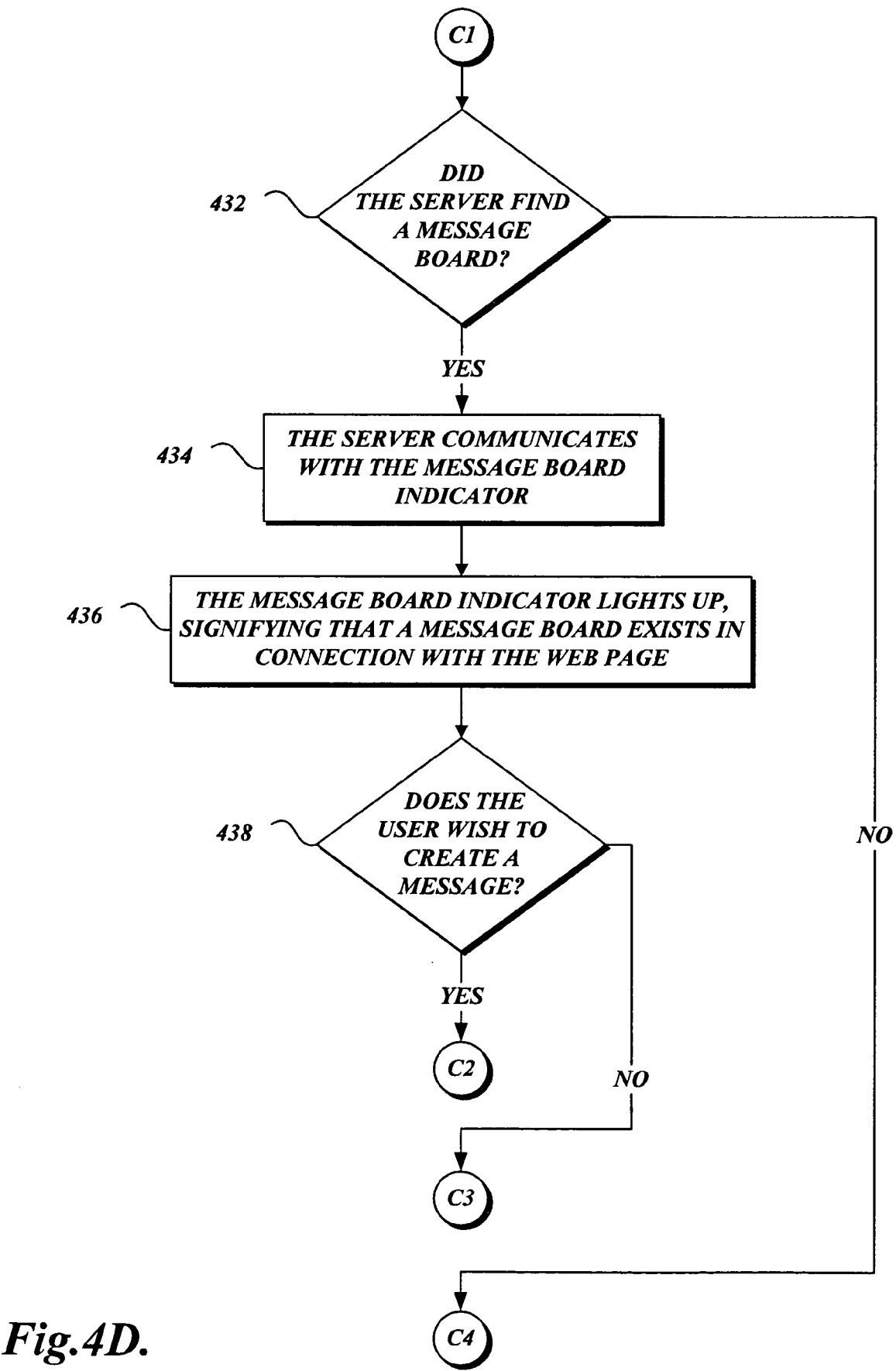
Figure 4E:
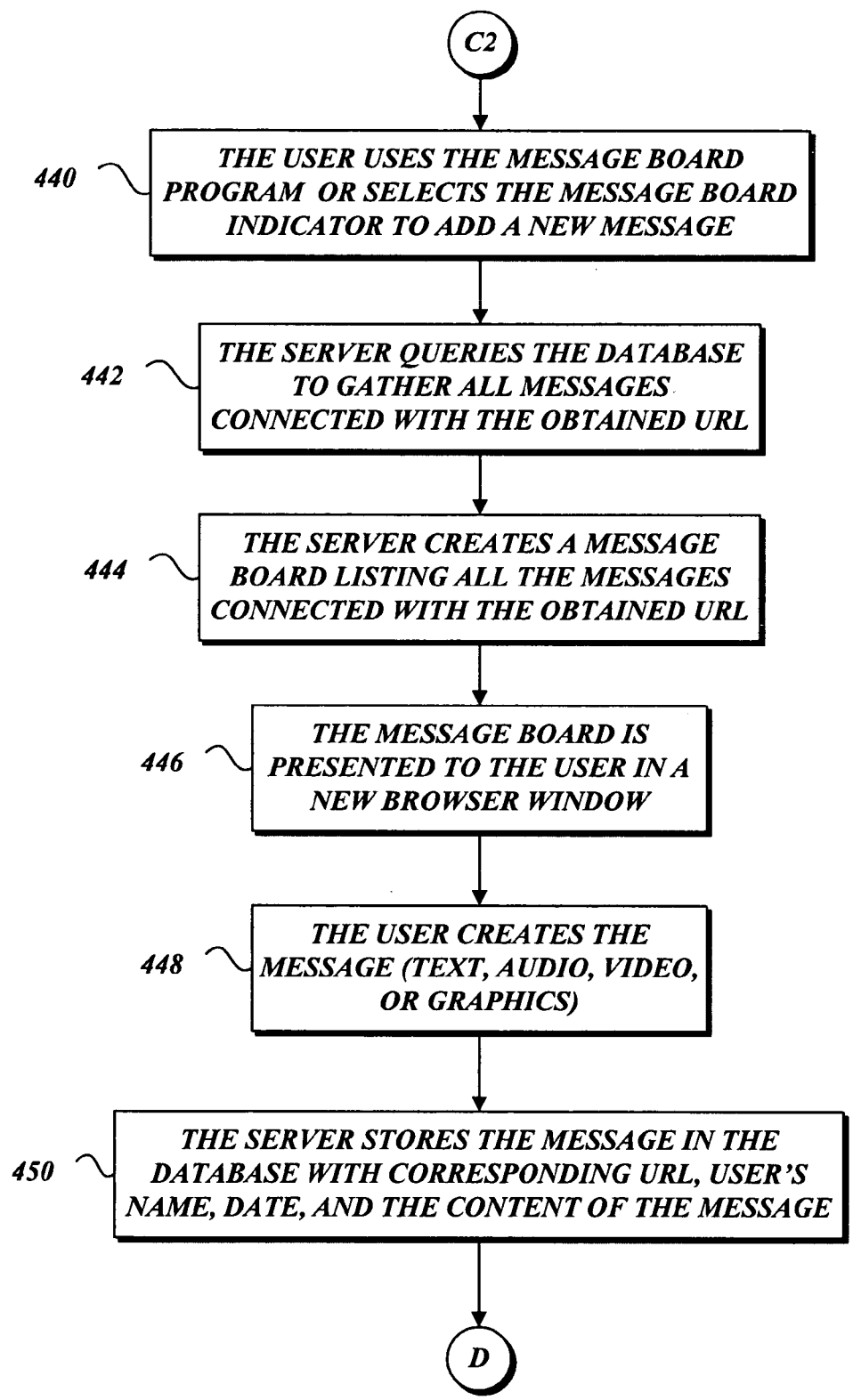
Figure 4F:
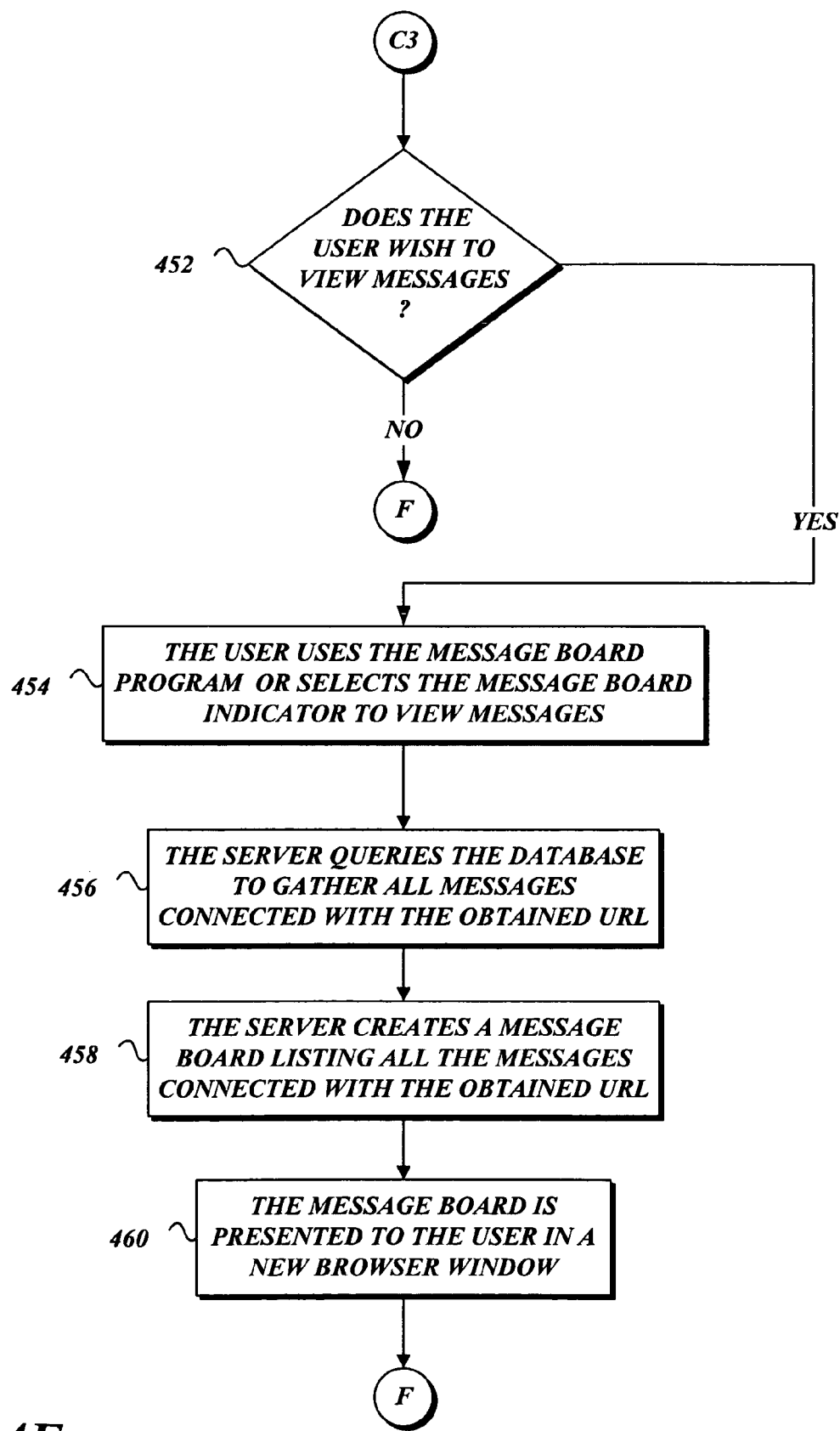
Figure 4G:
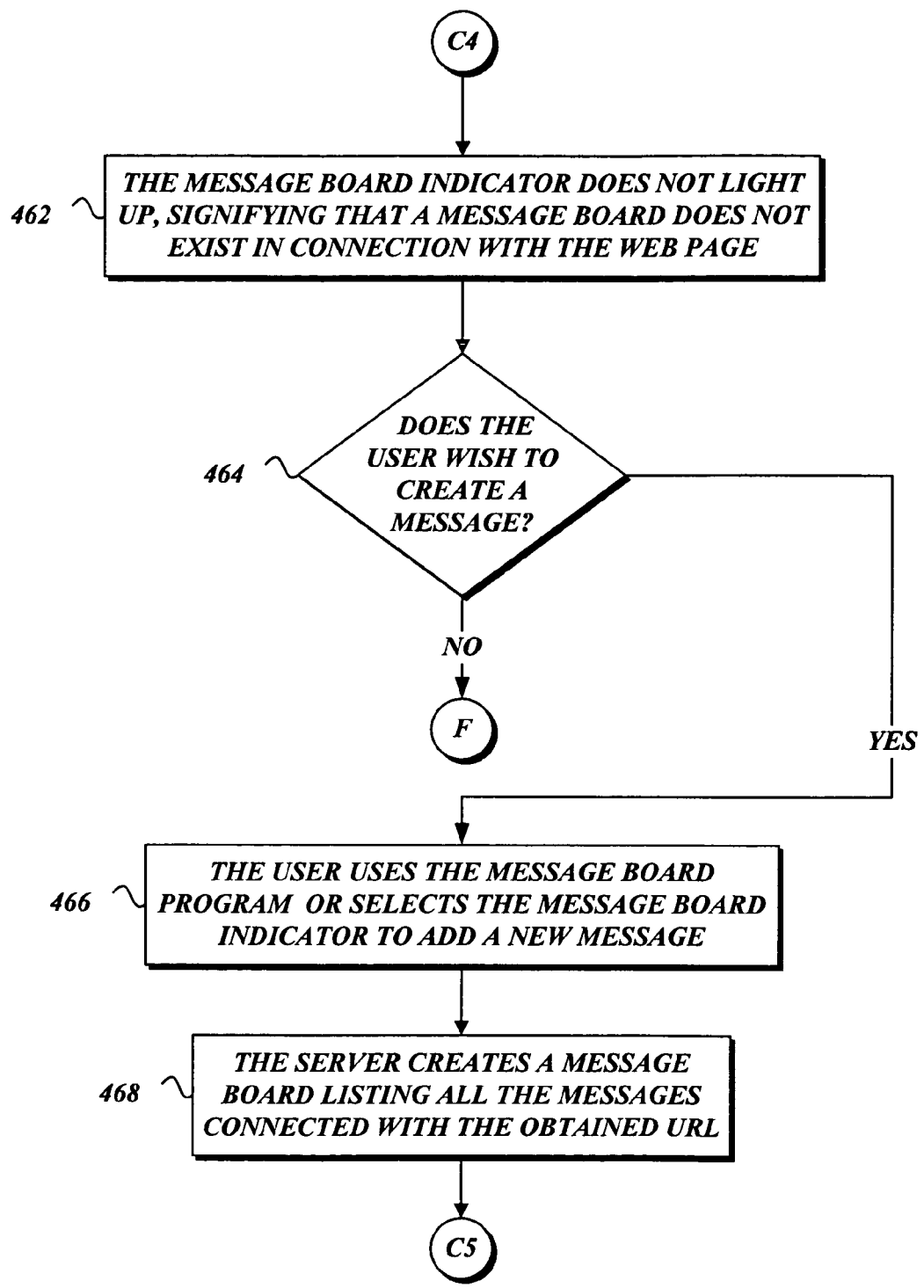
Figures 4H, 4I:
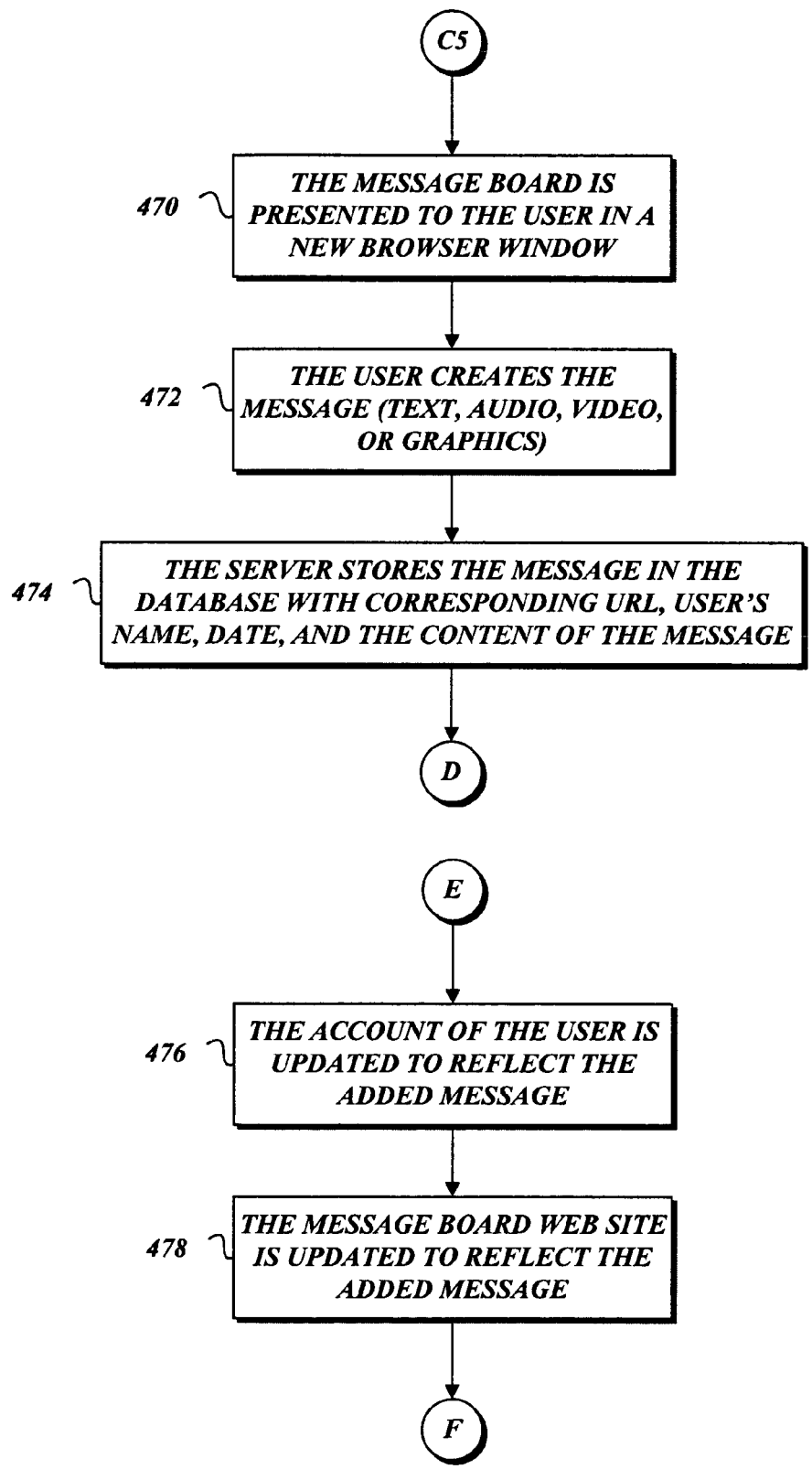

The server 216 is a computer or program running on a computer that responds to commands from a client, such as the application 212. The server 216 has access to one or more databases for storing messages that users, such as the user 202, post in connection with Web resources on the World Wide Web. FIG. 3 illustrates a portion of the information stored by the server 216.

The server 216 has access to a collection of messages 302, which is preferably formed from one or more data structures characterized by rows and columns, with data pertaining to messages and their metadata occupying or potentially occupying each cell formed by a row-column intersection. Column 302C1 signifies cells storing a URL at which a Web resource resides, such as a Web page, and with which a message posted by a user, such as the user 202, is connected. Column 302C2 contains cells that store a user account or a user identification, the user of which posts a message in connection with a Web resource, such as a Web page. Column 302C3 contains cells that store a date or time at which a user, such as the user 202, posts a message connected with a Web resource. Column 302C4 contains cells that store messages, which can be textual in form or in other suitable forms, such as graphics, audio, video, or executable applications.

Row 302R1 of the collection of messages 302 contains information associated with a message, such as the content of the message ("the brown fox jumps . . ."); and metadata, such as a uniform resource locator "URL1," a user account "Ed," and a date "May 1, 2004." Row 302R2 contains another message and metadata, such as a uniform resource locator "URL2," a user account "Tom," and a date "Jun. 1, 2004." Row 302R3 defines a further message and metadata, such as a uniform resource locator "URL1," a user account "JD," and a date "May 2, 2004." Row 302R4 also defines another message and metadata, such as a uniform resource locator "URL3," and a user account "Jon." Row 302R5 additionally defines a further message and its metadata, such as a uniform resource locator "URL4," and a user account "Ed."

Derived from the collection of messages 302 using suitable database queries is a personal message board 304. The message board 304 is specialized for a particular user and in this illustrative instance the message board 304 pertains to a user with the user account "Ed." Like the collection of messages 302, the message board 304 is also a collection of messages that are posted by a particular user, such as the user with the user account "Ed." The message board 304 may also contain replies by other users in response to the messages posted by the user account "Ed." Column 304C1 defines cells that store uniform resource locators. Column 304C2 defines cells that store the user account that posted messages or that of other users who have replied to the messages posted by the user with the user account "Ed." Column 304C3 contains cells that store the date on which messages are posted. Column 304C4 contains cells that store the contents of the messages. Row 304R1 contains the contents of the message "the brown fox jumps . . . " and its metadata, such as a uniform resource locator "URL1," a user account "Ed," and a date "May 1, 2004." Row 304R2 defines another message posted by the user account "Ed." Row 304R2 includes metadata, such as the uniform resource locator "URL4," a user account "Ed," and a date "Jun. 2, 2004."

A suitable Web site can query the server 216 to obtain all messages or selected messages that have been posted and stored by the server 216. A suitable Web browser application 306 can be used to display posted messages 306R1-306R5. The Web browser application 306 includes a toolbar, which is a horizontal space at the top of a window that contains a number of buttons in iconic form 306A-306C to allow the user, such as the user 202, to access various Web pages containing messages. The button 306A, which appears as a left-pointing arrow enclosed by a circle, allows a user to move backward through a history of displayed pages. The button 306B, which appears as a right-pointing arrowhead enclosed in a circle, allows the user to advance to a new Web page previously undisplayed. The button 306C is a HOME button that appears as a simple house enclosed in a circle, which returns the user to a home page when clicked upon. Appearing in the right corner of the toolbar is the name of the Web page, which in this instance is "HOME."

Line 306R1 shows that a message with a textual content "The brown fox jumps . . ." was posted by a user account "Ed" on a date "May 1, 2004." Line 306R2 shows that a textual message "Mary has a little lamb . . . " was posted by a user account "Ed" on a date "Jun. 2, 2004." Line 306R3 shows that a message containing one or more images was posted by a user account "JD" on a date "May 2, 2004." A camera icon on line 306R3 signifies that the message contains images. Line 306R4 describes a message containing one or more video clips (signified by a motion picture machine icon) that was posted by a user account "Jon" on a date "May 7, 2004." Line 306R5 describes a message whose contents include audio files as signified by a musical note icon. The message described by line 306R5 was posted by a user account "Tom" on a date "Jun. 1, 2004." Line 306R6 describes a message containing an executable application, which is illustrated by the simplified icon of two overlapping rectangles. The message described by line 306R5 was posted by a user account "Tom" on a date "Jun. 1, 2004."

FIGS. 4A-4I illustrate a method 400 for creating a message regarding a Web resource, such as a Web page. For clarity purposes, the following description of the method 400 makes references to various elements illustrated in connection with the system 200 (FIG. 2), the message board program 212, and the server 216. From a start block, the method 400 proceeds to a set of method steps 402, defined between a continuation terminal ("terminal A") and an exit terminal ("terminal B"). The set of method steps 402 describes the process of a user setting up an account for posting messages regarding Web pages.

From terminal A (FIG. 4B), the method 400 proceeds to block 408 where the user downloads a message board program 212 from a Web site. The user then creates an account that is associated with a unique Web address. See block 410. The unique Web address allows the user to gain access to his personal message board (e.g., personal message board 304) that contains messages posted by him or by others in reply to his messages. The account preferably is another message board containing queries to the server 216 to obtain all messages connected with the user having the account at the unique Web address. Next, at block 412, the unique Web address points to a personal message board of the user. The personal message board of the user contains messages posted by the user as well as replies by other users. See block 414. The method 400 proceeds to block 418 where the user elects to make public or private his personal message board to the Internet. If the personal message board of the user is public, any users can enter the unique Web address of the personal message board of the user to view messages. Otherwise, if the personal message board of the user is private, no one except the user may view his messages via the unique Web address. The method 400 then continues to the exit terminal B.

From the exit terminal B, the method 400 proceeds to a set of method steps 404, defined between a continuation terminal ("terminal C") and an exit terminal ("terminal D"). The set of method steps 404 describes the acts of the user visiting a Web page and creating a message regarding the Web page.

From terminal C (FIG. 4C), the method 400 proceeds to block 420 where the user activates a Web browser, such as the Web browser 208. Next at block 422, the user 202 activates the message board program, such as the message board program 212. Using the Web browser 208, the user 202 visits a Web page, which may be located at a Web site. See block 424. Next, at block 426, the message board program 212 polls the web browser 208 to obtain the URL of the Web page being visited by the user 202. The method 400 proceeds to block 428, where the message board program 212 communicates the obtained URL to the server 216. The server 216 searches the database to determine whether a message board has been created for the obtained URL regarding the Web page. See block 430. The method then proceeds to another continuation terminal ("terminal C1").

From terminal C1 (FIG. 4D), the method 400 proceeds to decision block 432 where a test is performed to determine whether the server found a message board. If the answer to the test at decision block 432 is NO, the message 400 proceeds to another continuation terminal ("terminal C4"). If the answer is YES to the test at decision block 432, the server 216 communicates with a message board indicator 210. See block 434. The message board indicator 210 lights up by activating user interface element 210A, among other things, signifying that a message board exists in connection with the Web page visited by the user 202. See block 436. A test is performed next at decision block 438 to determine whether the user wishes to create a message. If the answer is YES to the test at decision block 438, the method 400 proceeds to another continuation terminal ("terminal C2"). Otherwise, the answer to the test at decision block 438 is NO, and the method 400 proceeds to another continuation terminal ("terminal C3").

From terminal C2 (FIG. 4E), the method 400 proceeds to block 440 where the user 202 uses the message board program 212 or selects the message board indicator 210A or user interface element 210 to add a new message. The server 216 queries the database to gather all messages connected with the obtained URL. See block 442. Next, at block 444, the server 216 creates a message board listing all the messages connected with the obtained URL. The message board is presented to the user in a new browser window. The user 202 creates a message using various suitable media types, such as text, audio, video, graphics, or even executable applications. See block 448. At block 450, the server 216 stores the message in the database with corresponding URL, user's account, date, and the content of the message. See block 450. The process 400 then proceeds to an exit terminal ("terminal D").

From terminal C3 (FIG. 4F), the method 400 proceeds to decision block 452 where a test is made to determine whether the user wishes to view messages. If the answer to the test at decision block 452 is NO, the process 400 proceeds to an exit terminal ("terminal F."). Otherwise, the answer to the test at decision block 452 is YES, and the method 400 proceeds to block 454 where the user 202 uses the message board program 212 or selects the message board indicator 210, 210A to view messages. The server 216 queries the database to gather all messages connected with the obtained URL. See block 456. The server 216 creates a message board listing all messages connected with the obtained URL. See block 458. Next, at block 460, the message board is presented to the user 202 in a new browser window. The method 400 then continues to the exit terminal F.

From terminal C4 (FIG. 4G), the message board indicator 210, 210A does not light up, signifying that a message board does not exist in connection with the Web page. See block 462. A test is performed at decision block 464 to determine whether the user wishes to create a message. If the answer is NO, the method proceeds to the exit terminal F. Otherwise, the answer to the test at decision block 464 is YES, and the method 400 proceeds to block 466 where the user 202 uses the message board program 212 or selects the message board indicator 210, 210A to add a new message. The server 216 creates a message board listing all the messages connected with the obtained URL. See block 468. The method 400 then proceeds to another continuation terminal ("terminal C5").

From terminal C5 (FIGURE H), the method 400 proceeds to block 470 where the message board is presented to the user in a new browser window. The user 202 creates the message in any suitable media types, such as text, audio, video, graphics, or even an executable application. The server 216 stores the message in the database with corresponding URL, user's name or account, date, and the content of the message. See block 474. The process 400 proceeds to the exit terminal D.

From terminal D (FIG. 4A), the method 400 proceeds to a set of method steps 406, defined between a continuation terminal ("terminal E") and the exit terminal F. The set of method steps 406 describes the process of executing record keeping steps to track generated messages.

From terminal E (FIG. 4I), the method 400 proceeds to block 476 where the account of the user is updated to reflect the added message. The user can view posted messages and messages that are replies to his messages by other users. The view can be filtered by date of the user's messages or by date of the replies to the user's messages. Preferably, the messages are displayed in chronological order.

The method 400 then proceeds to 470A where the message board Web site is updated to reflect the added message. The method 400 then continues to the exit terminal F where it terminates its execution. Messages are preferably displayed in chronological order on the message board Web site. Among other things, the message board Web site can be used to retrieve lost passwords, set accounts, download the message board program, and so on. The message board Web site preferably has a search facility allowing users to search through all existing message boards to find desired messages. Additionally, the user may initiate a chat discussion with other users based on a particular message via the message board Web site.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer system, comprising:
a computer-readable medium having computer-executable instructions stored thereon for accessing a Web site at a particular URL that does not support posting of messages to a message board and for executing a message board program that periodically queries a Web browser for a URL being visited by a user, the message board program forwarding the URL; and
a display configured to show a user interface indicator that is selectable to create a message about the Web site posted to another message board notwithstanding that the Web site at the particular URL does not support posting of messages by referencing the message with the particular URL, name of a user creating the message, and a date on which the message is created, the message including an executable application.

2. The computer system of claim 1, further comprising a server that has access to the message, the server being receptive to a query that creates the another message board by collecting the message among other messages that were created by selection of the user interface indicator.

3. The computer system of claim 1, further comprising a network with which the server is coupled to the message board program.

4. The computer system of claim 1, further comprising a database for storing the message and other messages that are accessible by the server.

5. A method, comprising:
searching a database on a computer to form a collection of messages whose metadata includes an identical uniform resource locator of a Web resource, the collection of messages being defined as a message board, a message from the collection of messages including an executable application;
indicating to a user on a display who has navigated to the Web resource the presence or the absence of the message board even though the Web resource does not support the message board, the message board being present if the collection of messages are found by the act of searching, the message board being absent if the act of searching cannot find at least one message in the collection of messages; and
receiving by the computer an indication by the user to add a message associated with the Web resource, which is located at the uniform resource locator, the message being stored in the database and being discoverable by the use of the uniform resource locator.

6. The computer-implemented method of claim 5, further comprising querying by the computer to obtain the uniform resource locator visited by the user in operating a Web browser, the uniform resource locator being used by the act of searching to form the collection of messages.

7. The computer-implemented method of claim 5, further comprising receiving by the computer an indication by another to create a reply message in response to a message posted by the user, the reply message being stored in the database and being discoverable by the use of the uniform resource locator.

8. The computer-implemented method of claim 5, wherein each message is formed by the computer from text, graphics, video, audio, or executable applications.

9. A non-transitory computer-readable medium having computer-executable instructions stored thereon for implementing a computer-implemented method, comprising:
searching a database to form a collection of messages whose metadata includes a uniform resource locator of a Web resource, the collection of messages being defined as a message board, a message from the collection of messages including an executable application;
indicating to a user who has navigated to the Web resource the presence or the absence of the message board even though the Web resource does not support the message board, the message board being present if the collection of messages are found by the act of searching, the message board being absent if the act of searching cannot find at least one message in the collection of messages; and
receiving an indication by another to create a reply message in response to a message posted by the user, the reply message being stored in the database and being discoverable by the use of the uniform resource locator.

10. The non-transitory computer-readable medium of claim 9, further comprising querying to obtain the uniform resource locator visited by the user in operating a Web browser, the uniform resource locator being used by the act of searching to form the collection of messages.

11. The non-transitory computer-readable medium of claim 9, further comprising receiving an indication by the user to add a message associated with the Web resource, which is located at the uniform resource locator, the message being stored in the database and being discoverable by the use of the uniform resource locator.

12. The non-transitory computer-readable medium of claim 9, wherein each message is formed from text, graphics, video, audio, or executable applications.

* * * * *